Aug. 13, 1940.    M. ENOS    2,211,261
BERRY PIE DRIP PAN
Filed Oct. 24, 1939

Marguerite Enos, INVENTOR
BY Victor J. Evans & Co.
ATTORNEYS

Patented Aug. 13, 1940

2,211,261

UNITED STATES PATENT OFFICE 2,211,261

BERRY PIE DRIP PAN

Marguerite Enos, Jerseyville, Ill.

Application October 24, 1939, Serial No. 301,021

2 Claims. (Cl. 53—6)

This invention relates to drip pans to be used in combination with pie pans or the like for catching residue.

One of the objects of the invention is to provide an endless trough to receive residue from cooking vessels.

Another object of the invention is to provide a supporting means suspending a cooking vessel, centering and preventing tipping or tilting of the vessel within the drip pan.

A further object of the invention is to provide a drip pan adapted to catch residue through the medium of connecting supporting means and may be lifted as a unit from an oven thus eliminating the hazard of burned residue expelled from a cooking vessel into the oven.

Other objects and advantages will appear in the following specification and drawing when read with the claims.

Figure 1:
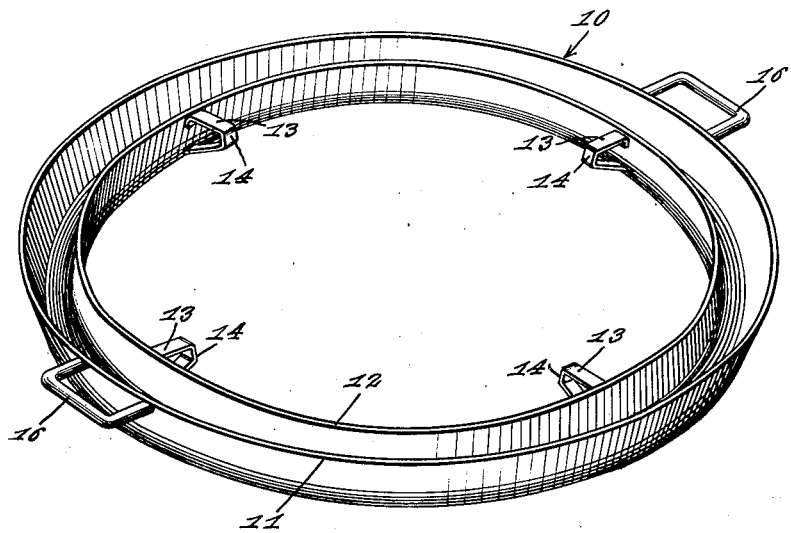
Figure 1 is a perspective view of the invention.
Figure 2:
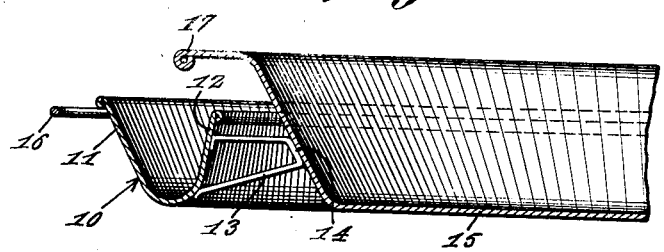
Figure 2 is a fragmentary sectional elevation of the invention associated with a cooking vessel.

Referring to the drawing, an annular trough 10 of substantially U-shape in cross section formed of sheet material includes an angular outer wall 11 directed away from an inner wall 12 at its upper edge.

Radially disposed arms 13 formed of strips of metal are bent and their extremities are secured to the inner wall 12 near its upper and lower edges within the circular opening of the trough 10. The bent portions are formed at an incline to present inclined faces 14 to conform to the inclination of the outer surface of the wall of a pie pan 15 or other cooking vessel to establish a connection between the annular trough 10 and the pie pan 15. Through this medium the pie pan 15 is held level relative to the annular trough 10 by the tendency of the weight of the pie pan and its contents to move downward on the faces 14 and prevent displacement of the pan.

For removing from or inserting the invention into an oven the handles 16 are grasped and lifted carrying the pie pan 15 which is mounted within the opening of the annular trough 10 out or into an oven as a unit.

The annular trough 10 which is in the nature of a drip pan is centered around and relative to the pie pan 15 underlying the peripheral flange 16 of the latter to catch the juices or other residue expelled over the flange 17, therefore preventing burning of the residue otherwise subjected to by other cooking vessels not equipped with this invention.

What is claimed is:

1. In the combination of a drip pan and pan support comprising an endless trough adapted to receive residue, a plurality of pan supporting arms extending toward one another from opposite points of their mounting on the outer face of the inner flange of the trough, one end of each of the arms being bent at right angles and secured to said outer face to extend outwardly from the outer face of an intermediate inclined portion of the arms to provide pie pan supports and an integral portion of each arm being secured to said outer face adjacent the base of the trough for bracing the inclined pan supporting portion of the arms between the point of its mounting and the pan support.

2. A drip pan attachment for pie pans comprising an endless channel forming a drip pan including an outer wall disposed at an angle extending outwardly from and relatively to an inner upstanding wall and a channel bottom formed integral and connecting the lower portions of the walls, a plurality of radially disposed arms extending from points opposite one another diametrically from the outer face of the inner wall, said arms providing inclined supporting rests at their free extremities engaging the side of the pie pan of a similar angle of inclination limiting the reception of the pan and centralizing the latter within the endless channel, whereby the peripheral edge of the pan disposed above and registering between said walls expels residue from the pan to the channel.

MARGUERITE ENOS.